(12) United States Patent
Narvaez et al.

(10) Patent No.: US 7,099,584 B1
(45) Date of Patent: *Aug. 29, 2006

(54) ADVANCED ERROR CORRECTING OPTICAL TRANSPORT NETWORK

(75) Inventors: Paolo L. Narvaez, Mountain View, CA (US); Gary S. Tse, San Mateo, CA (US); Lama Mouayad, San Jose, CA (US)

(73) Assignee: Raza Microelectronics, Inc., Cupertino, CA (US)

( * ) Notice: Subject to any disclaimer, the term of this patent is extended or adjusted under 35 U.S.C. 154(b) by 749 days.

This patent is subject to a terminal disclaimer.

(21) Appl. No.: 10/209,079

(22) Filed: Jul. 31, 2002

Related U.S. Application Data

(60) Provisional application No. 60/342,636, filed on Dec. 21, 2001.

(51) Int. Cl.
*H04B 10/20* (2006.01)
*H04J 14/00* (2006.01)
*H04J 14/08* (2006.01)

(52) U.S. Cl. .................. 398/58; 398/98; 370/476; 370/512

(58) Field of Classification Search .............. 398/68, 398/79, 58, 75, 98; 711/157; 370/476, 512
See application file for complete search history.

(56) References Cited

U.S. PATENT DOCUMENTS

| | | | |
|---|---|---|---|
| 6,608,844 B1 | 8/2003 | Teodorescu et al. | |
| 6,724,996 B1 | 4/2004 | Ballintine et al. | |
| 2001/0012141 A1* | 8/2001 | Takai et al. | 711/157 |
| 2002/0090007 A1 | 7/2002 | Kamiya et al. | |
| 2002/0109879 A1 | 8/2002 | Wing So | |

* cited by examiner

*Primary Examiner*—Jason Chan
*Assistant Examiner*—Quan-Zhen Wang
(74) *Attorney, Agent, or Firm*—Stevens Law Group

(57) ABSTRACT

A high-speed optical network includes according to the invention a housing having a plurality of slots for accommodating a number of line cards and an optional backplane facilitating communication between the line cards. The line cards include a client communication interface and a DWDM communication interface, for example, gigabit Ethernet interface, SONET interface or DWDM interface. Advantages of the invention include a high-speed network and network components that are capable of performing at a level consistent with optical network systems and which efficiently supports DWDM in a space-effective and cost-effective manner.

12 Claims, 15 Drawing Sheets

SONET Network
(prior art)

114

CLIENT

Upstream service integration
- Multiplexing
- Full transparency
- Oversubscription
- OTN overhead insertion
- Client signal performance monitoring
- Redundancy Adaptive FEC Engine Egress Clock Rate Adaption Ingress Clock Rate Recovery

ADVANCED ERROR CORRECTING OPTICAL TRANSPORT NETWORK

RELATED APPLICATIONS

This application claims priority to U.S. Provisional No. 60/342,636 filed Dec. 21, 2001, incorporated herein by reference.

FIELD

The invention relates to the field of telecommunications, and more particularly to a network for transporting information over optical fibers and devices including integrated circuit components for constructing the network.

BACKGROUND

Advances in network communication and switching are moving ahead with great speed. The advent of optical network connections requires the evolution of network multiplexing and transmission technologies that can perform at high rates. Some of the technologies that assist in high performance include Dense Wavelength Division Multiplexing (DWDM). An advantage of DWDM is that many light waves carrying different data can be transmitted through the same fiber simultaneously. This parallel communication is very efficient since the same fiber can be used to transport many communication links.

The companies that build and operate the network backbone are called carriers and they define the network system requirements, which are ordinarily based on predicted user demand. Typical contemporary carrier requirements include: more bandwidth and greater transmission distance; better bandwidth utilization per wavelength; network visibility and manageability across subnetworks; smaller form factor, less power and lower cost; and preservation of legacy equipment.

Conventional technology, however, requires a very large number of devices to achieve the required rates and it does not provide support for future high data rate transport needs. Existing DWDM systems do not provide for adequate integration of the network components, and therefore, require a significant amount of space, which is at a premium in small central offices and other network locations.

The predominant problems with first-generation DWDM systems involve the inefficient use of wavelengths, because each service may require a dedicated wavelength. Furthermore, these solutions provide only simple transport of client signals (e.g., Optical Carrier level 48 (OC48), Gigabit Ethernet) without DWDM monitoring or client-specific monitoring. Second-generation DWDM systems use SONET/SDH (Synchronous Optical NETwork/Synchronous Digital Hierarchy) framing to address some of these problems, but still have shortcomings of their own. Some of these problems include: limited transparency; little to no support for strong forward error correction (FEC); inefficient transport of packet traffic (e.g. Ethernet); and a deep protocol stack that requires many chips and complex line card designs.

What is needed is a high-speed network and network components that are capable of performing at a level consistent with optical network systems and which efficiently support DWDM in a space-effective and cost-effective manner.

SUMMARY

The invention overcomes the identified limitations and provides a high-speed network and network components that are capable of performing at a level consistent with optical network systems and which efficiently support DWDM in a space-effective and cost-effective manner.

An exemplary embodiment of the invention includes a housing having a plurality of slots for accommodating a number of line cards, and an optional backplane for connecting with the line cards and facilitating communication between the line cards. The line cards include a number of external client communication interfaces, (e.g., Gigabit Ethernet, SONET) and a number of DWDM interfaces. In systems containing the optional backplane, the line card includes a backplane interface in the place of the client or DWDM interfaces. A communication circuit coupled to the client interface and DWDM interface is configured to decode inbound communications and encode outbound communications. The line card can be configured for a number of different client physical interfaces, for example, synchronous optical network (SONET), Gigabit Ethernet (GigE) and others.

The invention includes a number of advantages over prior technologies. For example, the invention provides improved bandwidth utilization per wavelength by supporting the combination of many heterogeneous services to fully utilize a wavelength, and statistical multiplexing with oversubscription of packet traffic. In addition, the invention provides greater network visibility and manageability across subnetworks including full transparency, and separate control and management functions for each network layer. Since the invention employs a smaller form factor than previous designs, it also uses less power and provides a lower cost solution. Part of the cost saving is due to the intelligent integration of most optical transport functionality on a single chip and the use of a common line card design for different services. Further, the invention preserves the use of legacy equipment by being backward compatible with SONET framing, packet over SONET (POS), virtual concatenation and other protocols.

One aspect of the invention further optimizes the FEC by monitoring the error pattern, and reconfiguring the FEC algorithm for the optical channel in use. The optimization can be applied all the way down to the lambda level, where each wavelength of a DWDM communication link can have its own FEC algorithm. Since optimization can vary among logical communication links, the FEC encoder and FEC decoder can implement different FEC optimization parameters or algorithms.

Advantages of the invention include a high-speed network and network components that are capable of performing at a level consistent with optical network systems and which efficiently support DWDM in a space-effective and cost-effective manner.

BRIEF DESCRIPTION OF THE FIGURES

The invention is described with reference to the Figures, in which.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Internet Protocol, but any packet protocol is applicable. Moreover, reference is made to chips that contain integrated circuits while other hybrid or meta-circuits combining those described in chip form is anticipated. The exemplary embodiment is provided for DWDM transport equipment where the speed is 10 Gbps or 40 Gbps per wavelength, yet any speed faster or slower and consistent with the invention is anticipated.

A. Overall Network Architecture

1. Conventional Network Architecture

Figure 1A:
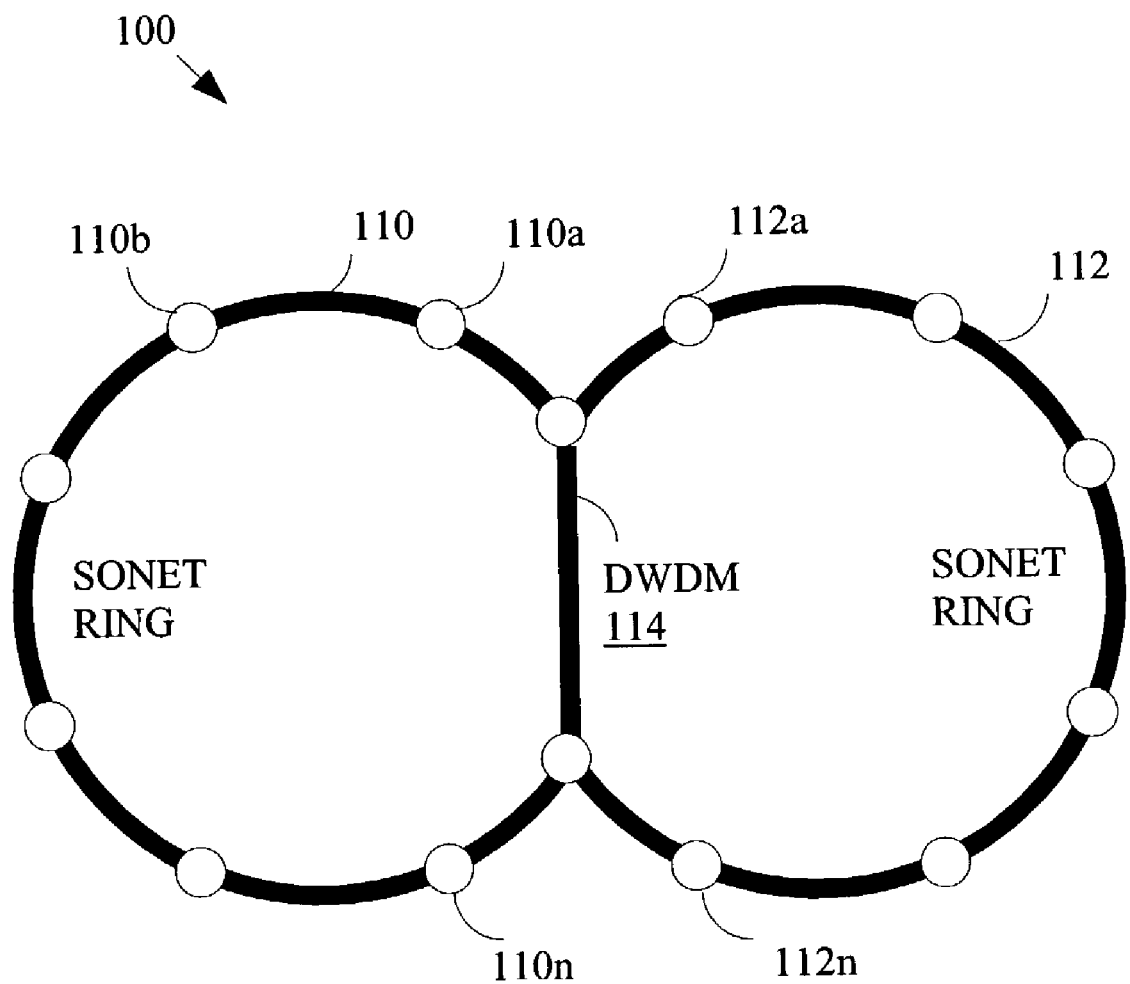
FIGS. 1A–C depict a conventional optical telecommunications network according to the prior art.
Figure 1B:
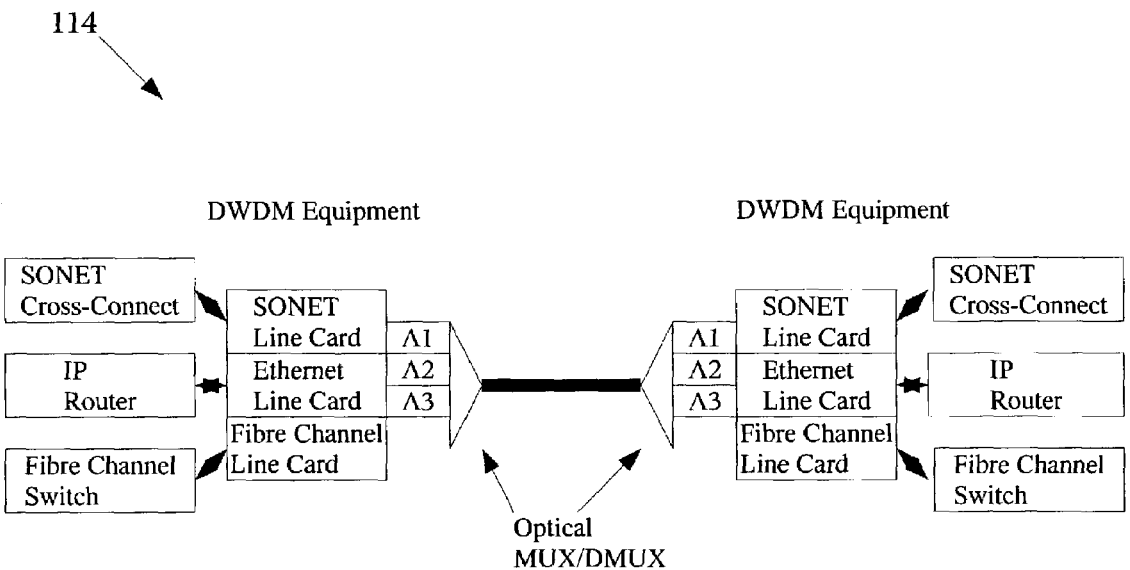
Figure 1C:
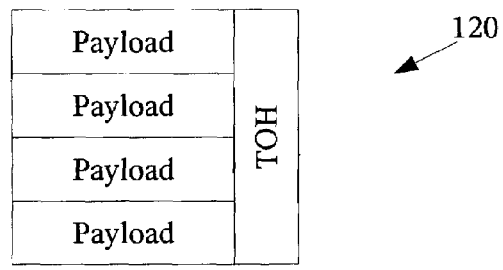

FIGS. 1A–C depict a conventional optical telecommunications network 100 according to the prior art. The network includes SONET (synchronous optical network) rings 110 and 112 that communicate the information among their respective nodes 110a–110-n and 112a–112n. A dense wavelength division multiplexing (DWDM) segment 114 is located along both rings. FIG. 1B represents the DWDM portion of the network. Note that there are three types of communications networks attached to the DWDM equipment: a SONET interface, an IP interface (Internet Protocol using Ethernet) and a Fibre Channel interface. The DWDM equipment has separate line cards that are compatible with each of these interfaces. If the operator wants to add SONET interfaces, the operator must add SONET interface cards. FIG. 1C depicts a data frame 120, which represents a portion of the information communicated with the DWDM equipment. The data frame includes overhead conventionally associated with each of the payloads (TOH).

Figure 2A:
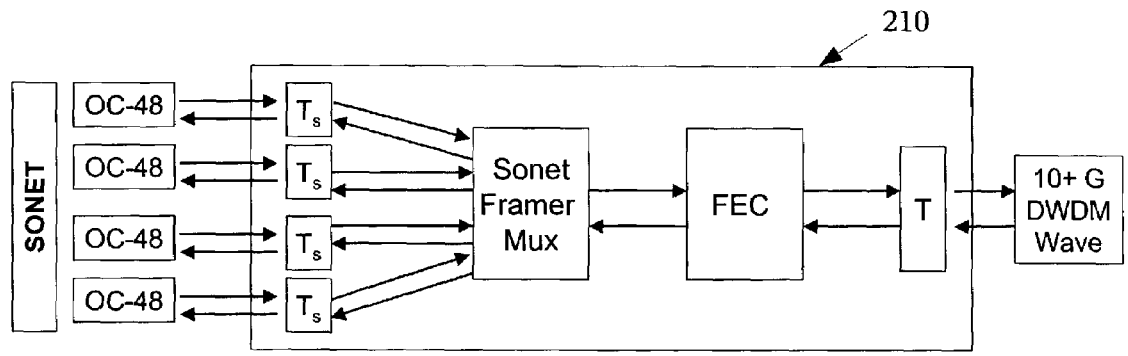
FIGS. 2A–B depict conventional line cards according to the prior art.
Figure 2B:
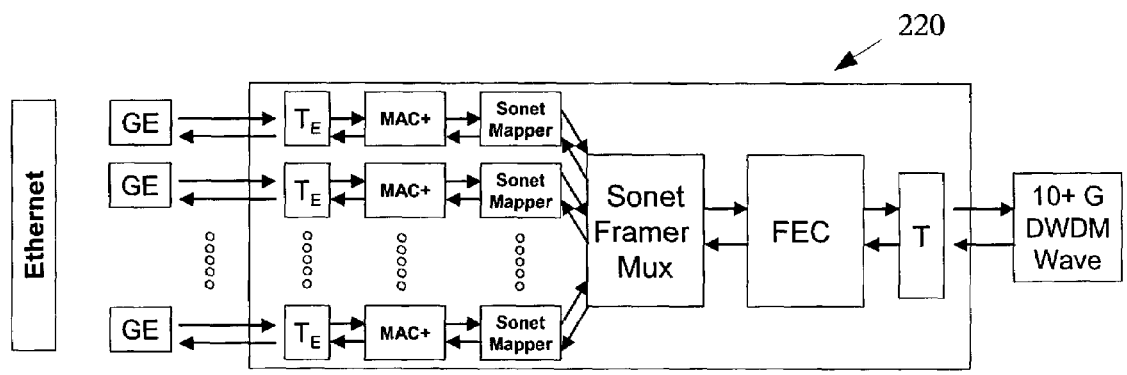

FIGS. 2A–B depict conventional line cards according to the prior art. Each of the line cards 210 and 220 are configured for specific types of physical inputs with specific communication protocols. These cards are deployed in portions of the network shown in FIG. 1B. Line card 210 is designed to interface with four OC48 channels using a SONET protocol. The card includes a number of interface circuits and a SONET Framer Multiplexor, which are specially designed for the SONET protocol. The Multiplexor is designed to receive information from the four interface circuits and to combine the data into a high-rate stream. The FEC applies an error correction code and then communicates with a transponder to send and receive the data over the DWDM link. Note that this line card design requires separate chips to perform the functions. The significant number of circuits results in high cost and low flexibility.

Line card 220 is designed to interface with multiple GigE channels. The card includes a number of interface circuits, media access control (MAC) chips, and a SONET mapper, which are specially designed for the Ethernet protocol. Additionally, the card includes a SONET Framer Multiplexor. The Multiplexor is designed to receive information from the four interface circuits and to combine the data into a high-rate stream. The FEC applies an error correction code and then communicates with a transponder to send and receive the data over the DWDM link. Note that this line card design requires separate chips to perform the functions. The significant number of circuits results in high cost and low flexibility.

2. New Network Architecture

Figure 3:
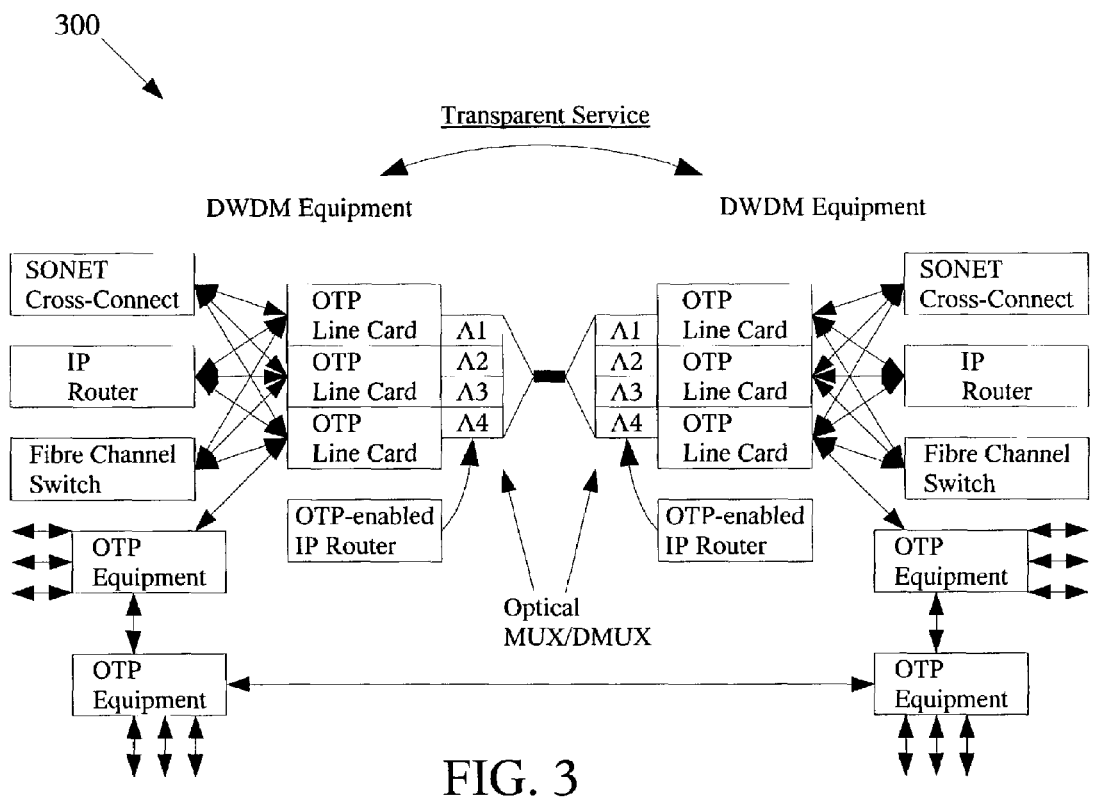
FIG. 3 depicts a transport network according to an embodiment of the invention.

FIG. 3 depicts a transport network 300 according to an embodiment of the invention. The invention includes a number of line cards that are capable of interfacing with a plurality of different physical interfaces and protocols. Specifically, note in the Figure that the line cards are cross-connected to SONET, IP and Fibre Channel networks. Note also the addition of Optical Transport Protocol (OTP) equipment that is connected to one of the line cards. As shown in FIG. 3, one of the important advantages of the invention is the ability for the line cards to communicate with a variety of standard interfaces and protocols. As described below in greater detail, the invention receives inbound information in a number of different formats and preserves the conventional overhead structure in the native protocol including packet identification and routing information. The invention wraps the inbound information in an Optical Transport Wrapper referred to as OTN Overhead (OTN OH) and transmits the information along the DWDM segment to a receiver that then unwraps the information and sends the information on its way in its native format.

Figure 4A:
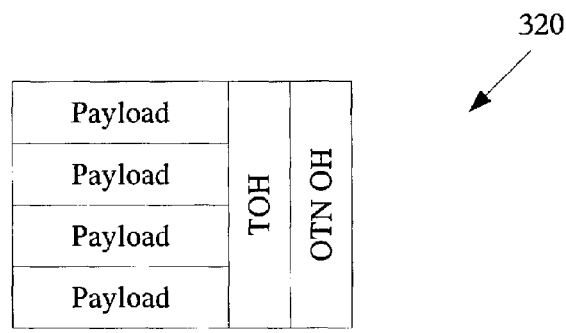
FIGS. 4A–C depict an exemplary transformation of information using an OTN wrapper technique according to an embodiment of the invention.
Figure 4B:
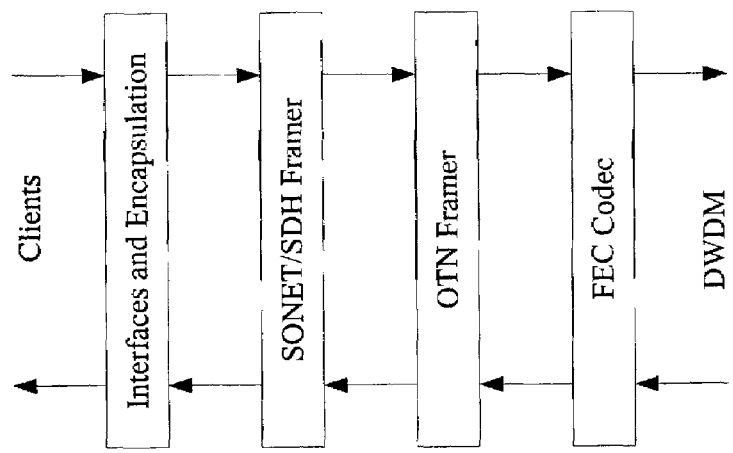
Figure 4C:
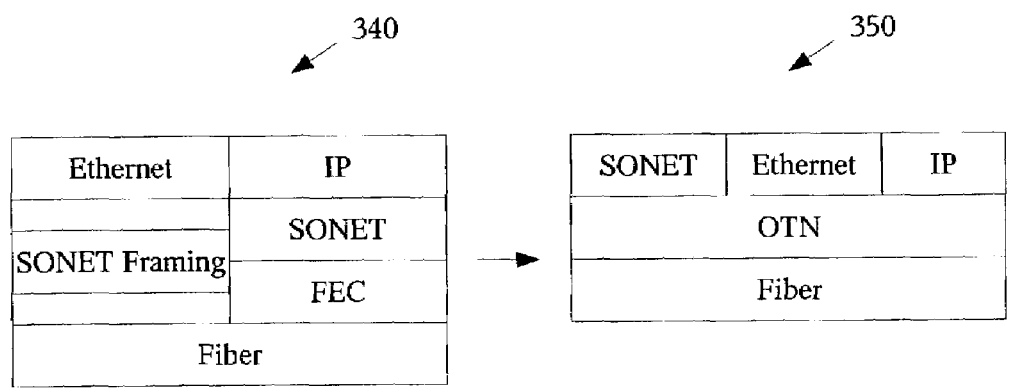

FIGS. 4A–C depict an exemplary transformation of information using an OTN wrapper technique according to an embodiment of the invention. This is one of the underlying techniques for communicating with a number of different protocols in their native format and preserving the overhead structure in the native protocol including packet identification and routing information. FIG. 4A depicts information to be communicated 320 having number of payloads that represent information. The TOH is the transport overhead of the native protocol including packet identification and routing information. The OTN OH is the optical transport network overhead that wraps up the payload and TOH, and preserves its integrity. This is an important aspect of the invention because it allows the network to restore the conventional overhead when the data is received by a line card at the receiving end of the DWDM equipment. Consequently, the client signal is not modified by DWDM network. This allows virtually any client to use the invention as a transparent service. The client can work with the conventional overhead and does not see the OTN overhead. In fact, the client network sees the DWDM network as a wire.

In addition to the features described above, the invention provides support for efficient multiplexing. Since the new DWDM network has its own overhead and network management, the invention can provision the communications without requiring the client network interaction. In essence, the client network sees the DWDM network as transparent. The new DWDM link is transparent to the services that use the link. The link is very high-speed, efficient, and can provide services to virtually any type of data connection.

FIG. 4C depicts a relationship between the emerging standards and the invention. Reference number 340 depicts a conventional framing protocol stack that is applicable to today's transport of Ethernet, Internet Protocol, and SONET over Fiber. This type of framing has all the problems discussed above that relate to existing DWDM networks. Reference number 350 depicts a new framing protocol stack that is applicable to more protocols, and therefore supports more heterogeneous applications. The frame 350 employs, as a part of the frame, an Optical Transport Network (OTN) overhead that is currently in discussion with the T1.X1 and ITU standardization bodies.

The use of the frame 350 provides for service transparency for SONET/SDH, Ethernet, ATM (asynchronous transfer mode), IP, MPLS (multi-protocol label switching). The frame does not replace SONET, and does not require a change to SONET/SDH.

Figure 5:
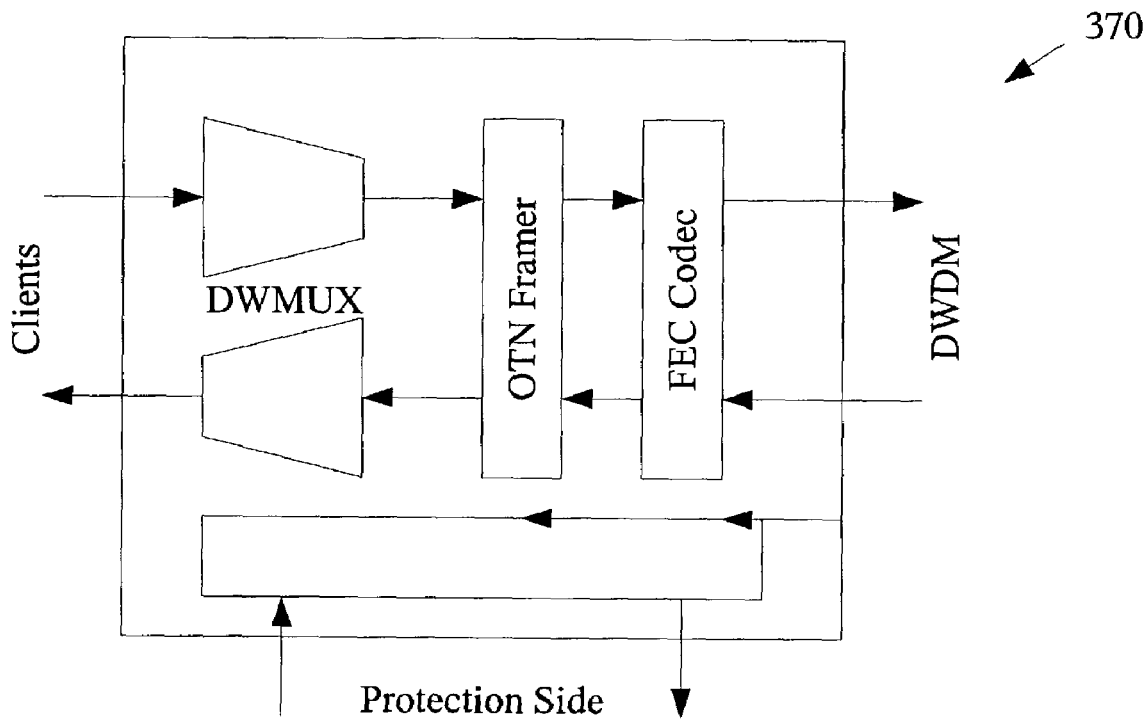
FIG. 5 depicts a high-level integrated circuit chip according to an embodiment of the invention.

FIG. 5 depicts a high-level integrated circuit logical architecture for a chip 370 that performs the techniques according to the invention, which is described in more detail below. According to one embodiment, the chip includes an interface for communication with a terminal circuit (shown below) on the client side, e.g. SONET, Fibre Channel, Gigabit Ethernet, etc. The terminal circuit is designed to provide a physical interface with the network and the network protocol. The chip 370 employs an OTN framing circuit to frame and de-frame the data as required. The OTN framing circuit communicates with a forward error correction (FEC) circuit that encodes and decodes the data as required. Chip 370 further includes a protection port that generally provides overall fault protection and re-routing as explained below.

The new design employs a number of novel circuit structures. One of the design novelties is embedding an array of pipelined general processor cores into the chip to perform most framing functions. The more complex aspects of the framing functionality are coded in software that runs on the processor cores. This technique simplifies substantially the implementation by moving much of the complexity to software. It also makes the chip flexible and highly programmable. When a new client protocol is used or when a new type of framing is desired, the functionality can be changed by simply rewriting the software and reprogramming the cores and without changing the hardware. In conventional architectures, such changes in a transport or framing chip would require a building a new hardware unit.

In addition, the invention includes a number of advantages over prior technologies. For example, the invention provides improved bandwidth utilization per wavelength by supporting the combination of many heterogeneous services to fully utilize a wavelength, and statistical multiplexing with oversubscription of packet traffic. In addition, the invention provides greater network visibility and manageability across subnetworks including full transparency, and separate control and management functions for each network layer. Since the invention employs a smaller form factor than previous designs, it also uses less power and provides a lower cost solution. Part of the cost saving is due to the intelligent integration of most optical transport functionality on a single chip and the use of a common line card design for different services. Further, the invention preserves the use of legacy equipment by being backward compatible with SONET framing, packet over SONET (POS), virtual concatenation and other protocols.

One aspect of the invention further optimizes the FEC by monitoring the error pattern, and reconfiguring the FEC algorithm for the optical channel in use. The optimization can be applied all the way down to the lambda level, where each wavelength of a DWDM communication link can have its own FEC algorithm. Since optimization can vary among logical communication links, the FEC encoder and FEC decoder can implement different FEC optimization parameters or algorithms.

B. New Network Components

1. Line Cards

Figure 6A:
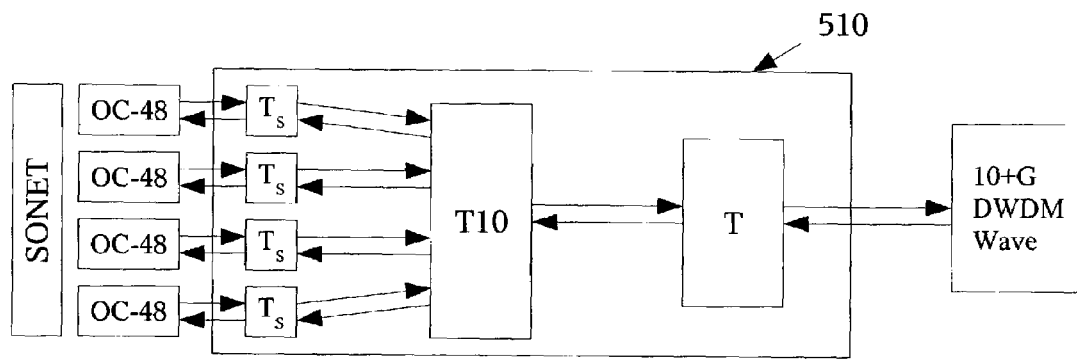
FIGS. 6A–C depicts lines card according to embodiments of the invention.
Figure 6B:
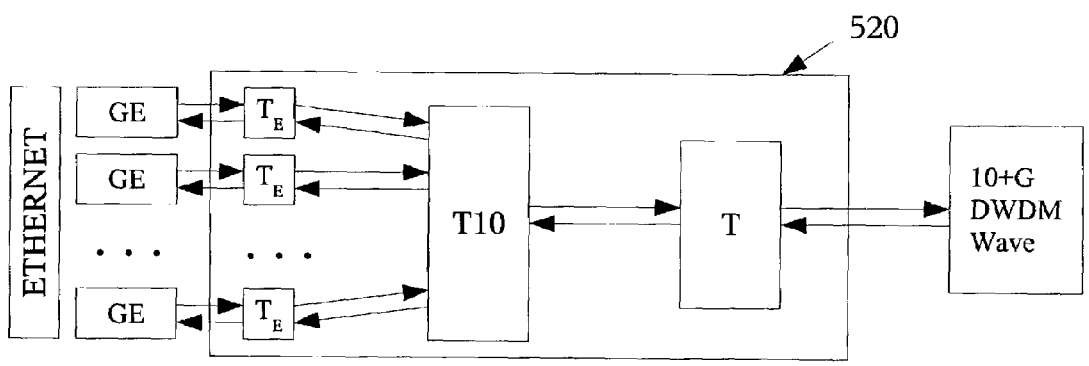
Figure 6C:
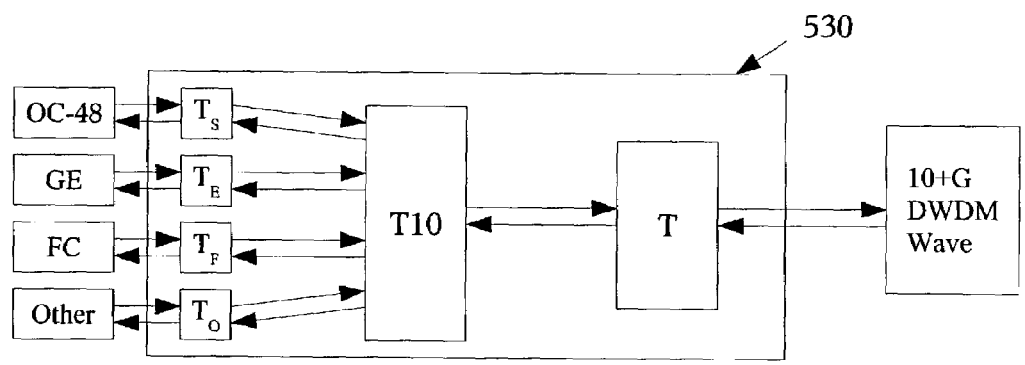

FIGS. 6A–C depicts lines card according to embodiments of the invention. FIG. 6A depict line card 510 according to an embodiment of the invention, which includes interface circuits for a SONET network interface and a novel T10 chip, which is described in detail below. The combination of the card with the physical interface and the T10 chip with its hardware and software features is sufficient to accomplish all the necessary functions required by the transport network. Likewise, FIG. 6B, line card 520 includes interface circuits for a Gigabit Ethernet network interface and a novel T10 chip. The combination of the card with the physical interface and the T10 chip with its hardware and software features is sufficient to accomplish all the necessary functions required by the transport network.

FIG. 6C depicts a line card 530 that is similar to 510 and 520, but the interface circuits are capable of communicating with a number of different network interfaces and protocols. These protocols can include, for example, OC-48, GigE, FC, and other types of interfaces. The combination of the card with the physical interface and the T10 chip with its hardware and software features is sufficient to accomplish all the necessary functions required by the transport network.

2. Integrated Circuit Design Details and Features

Figure 7A:
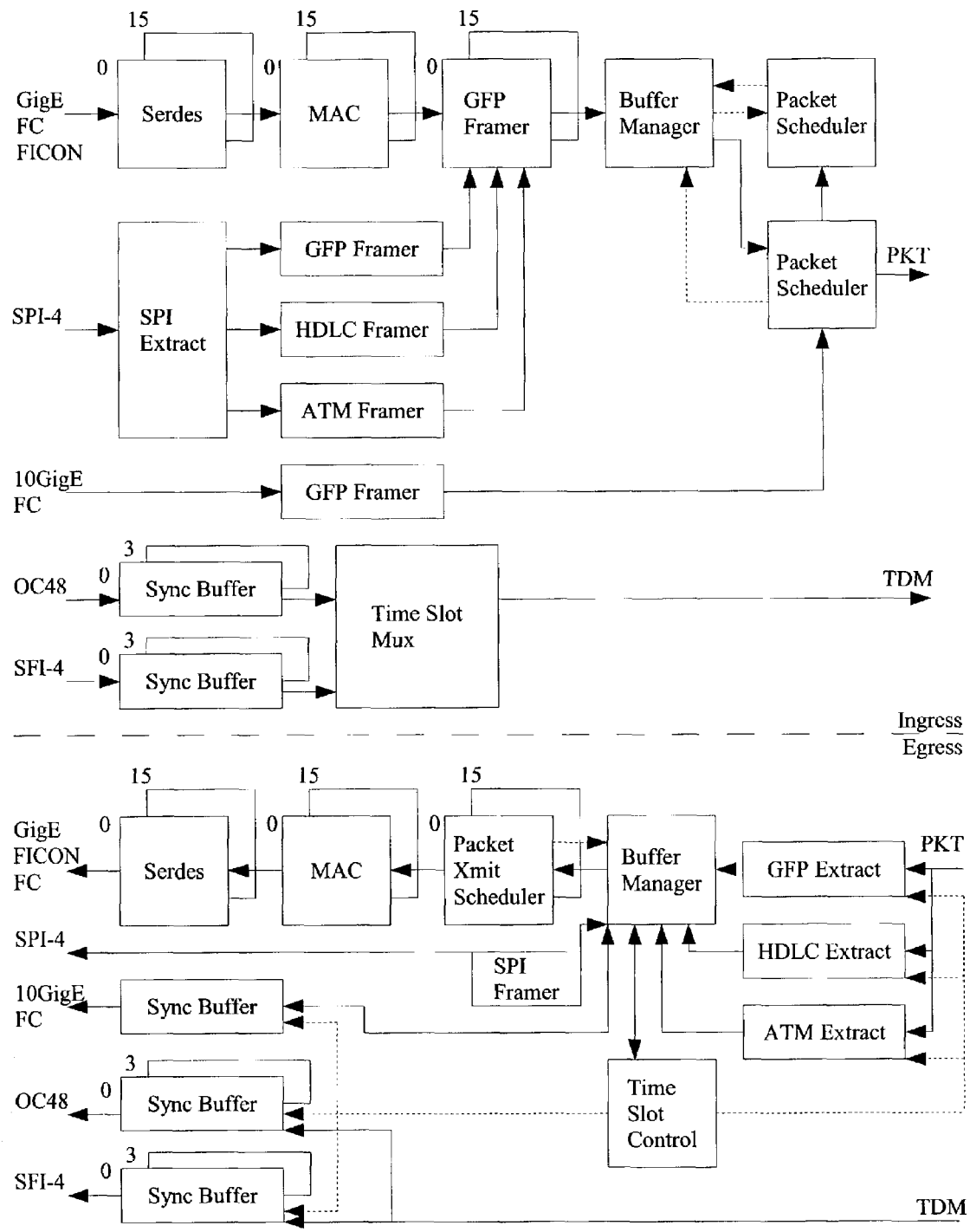
FIGS. 7A–C depict detailed views of an integrated circuit chip according to an embodiment of the invention.
Figure 7B:
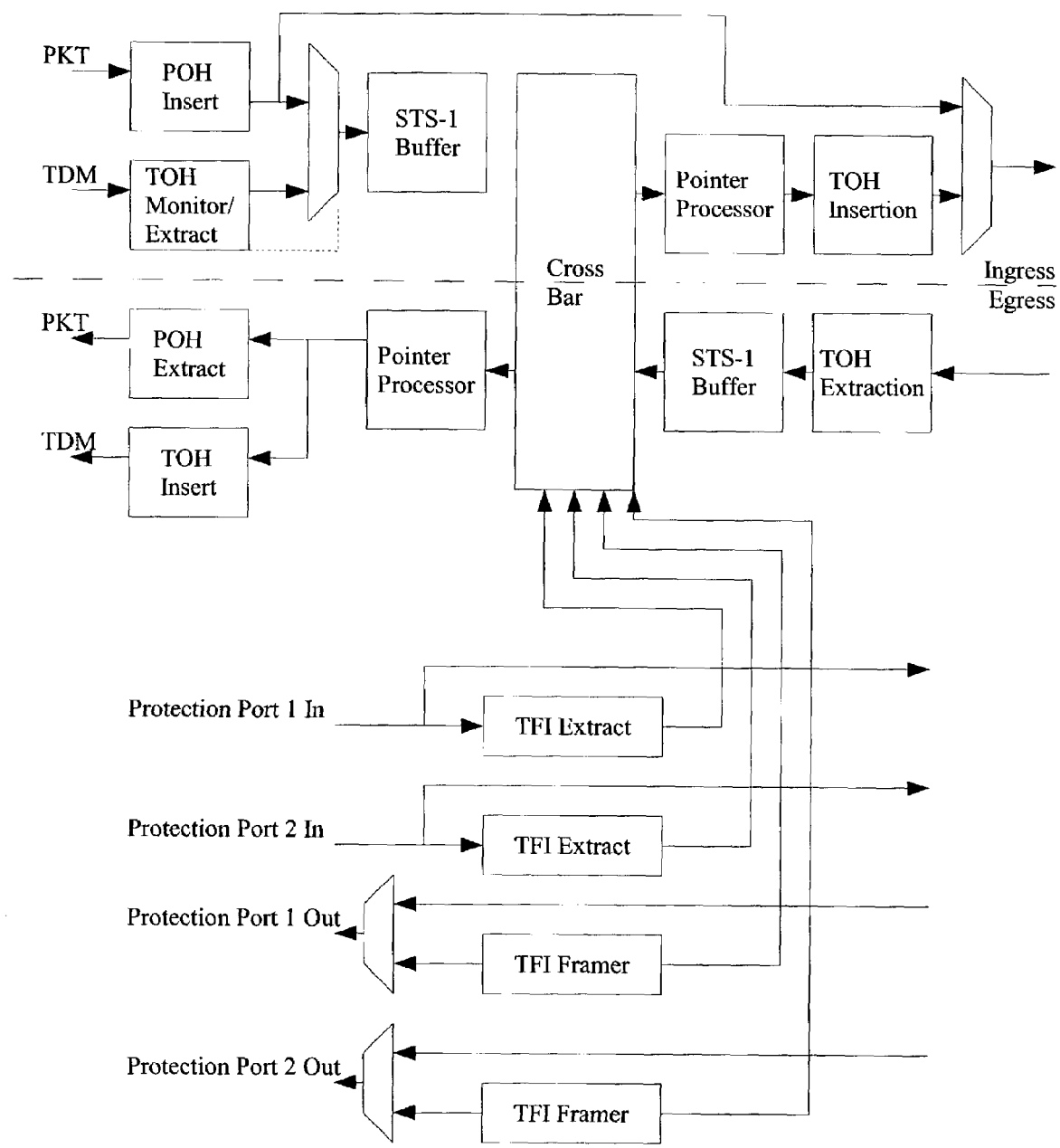
Figure 7C:
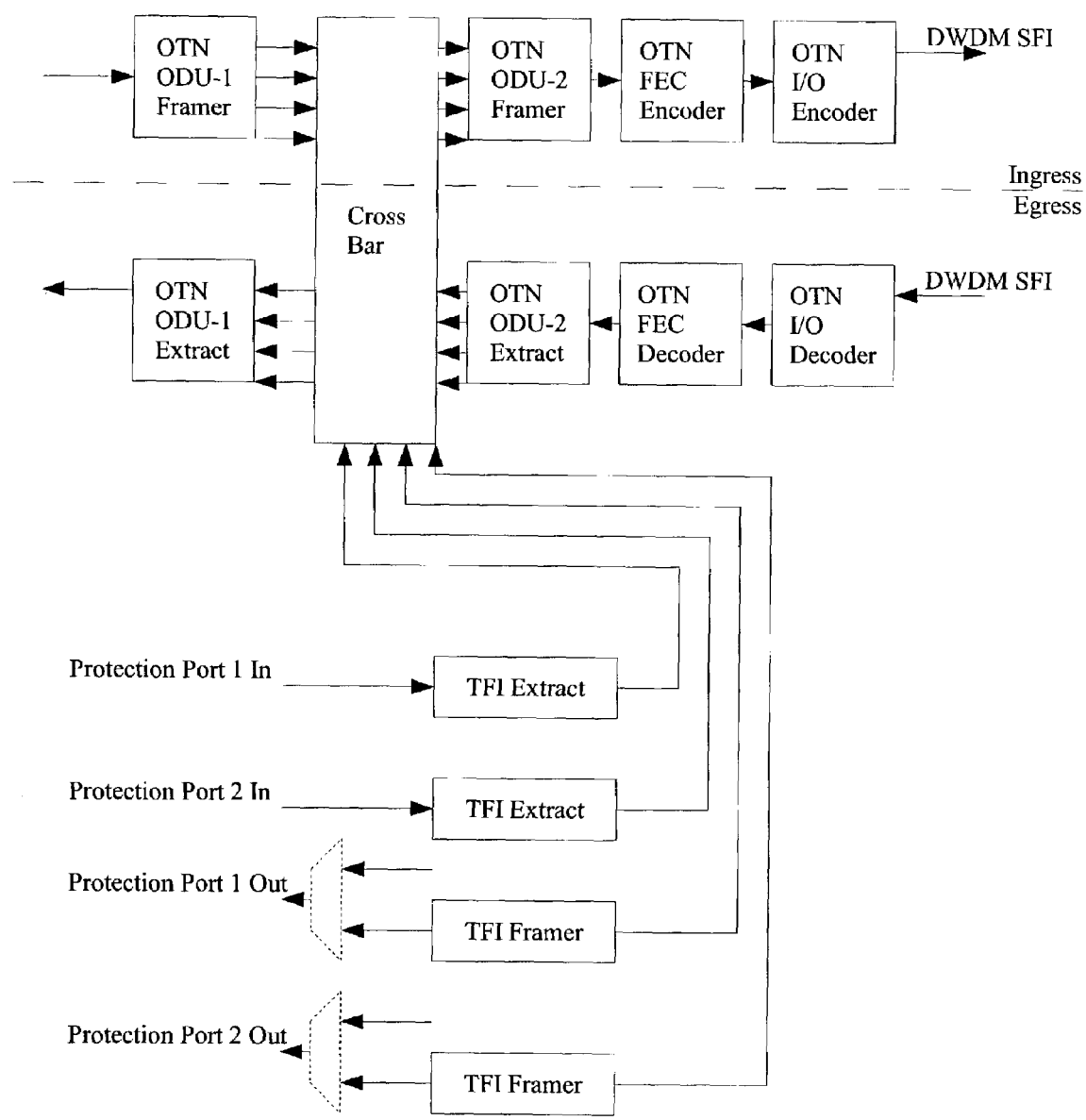

FIGS. 7A–C depict detailed views of an integrated circuit chip 370 according to an embodiment of the invention, which can support a high data rate (e.g. 10 Gbps, 40 Gbps or greater). The figures are divided by the logical ingress and egress data flow, with ingress shown at the top and egress shown at the bottom. The protection port circuitry is shown at the bottom portion of FIGS. 7B–C.

FIG. 7A shows the interface for communication with a terminal circuit on the client side, e.g. SONET, Fibre Channel, Gigabit Ethernet, etc. The terminal circuit is designed to provide a physical interface with the network and the network protocol, as shown in FIGS. 6A–C above. The chip includes an interface for communication with a terminal circuit on the client side, called the terminal circuit. The chip communicates with the terminal circuit and employs an OTN framing circuit to frame and de-frame the data as required. The OTN framing circuit communicates with a forward error correction (FEC) circuit that encodes and decodes the data as required.

The chips perform upstream service integration by providing multiplexing, full transparency, oversubscription, OTN overhead insertion, client signal performance monitoring, and redundancy.

FIGS. 7B–C show the protection port circuitry and the structure for routing any necessary information to the chip 370 and to and from other chips in the system. In the exemplary embodiment, the protection port is a serial communications port.

The new chip is capable of aggregating different services (e.g., Ethernet, SONET, Fibre Channel, IP) into a single optical transport unit OTU frame. This OTU is then used as the transport envelope over an Optical Transport Network.

This allows any arbitrary combination of heterogeneous services to be carried over a single wavelength in an OTN network.

A novel aspect of the new approach is that the aggregation of all these services is performed directly on the OTU frame, without requiring any higher layer protocols (such as SONET or Ethernet) to multiplex the signals before filling up the OTU frame.

The new chip can accept popular protocol streams (such as SONET, Ethernet, IP) as inputs. Furthermore, it is capable of accepting any arbitrary bitstream input. This allows the new design to provide protocol independent transport since any arbitrary bitstream can be accepted, multiplexed into an OTU frame, and carried across the OTN network. Any future protocol standard (such as future digital video streams) will be able to be aggregated into an OTN wavelength using the new chip.

The new chip can accept individual inputs down to an OC-12 (622 Mbps) granularity. Service inputs of size 2.5 G or greater can be accommodated into standard OTU frames. In order to accommodate smaller granularity inputs, the new design has its own sub-2.5 G envelopes that can be filled with these low-rate inputs. These envelopes are placed inside OTU frames. These envelopes are used to isolate the various inputs within the OTU frames.

Figure 8:
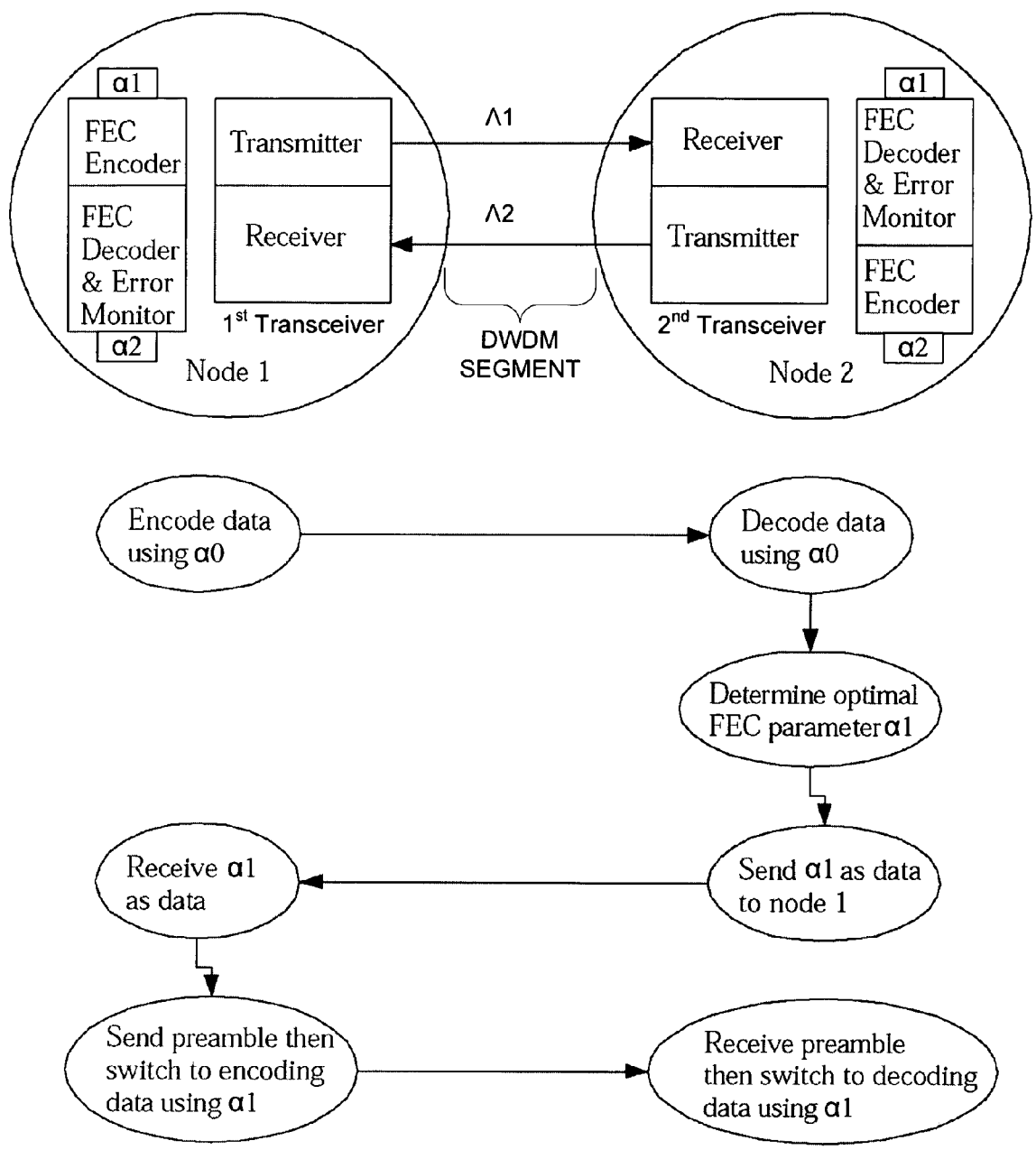
FIG. 8 illustrates an exemplary operation of an adaptive FEC engine according to an embodiment of the invention.

FIG. 8 illustrates an exemplary operation of an adaptive FEC engine according to an embodiment of the invention. The new chip reports and characterizes the error pattern on an optical link. It reports error patterns, and error type (such as 1 flipped to 0, 0 flipped to 1, bit insertion, bit deletion). This differs from prior art in error monitoring which only reported the average bit error. This detailed monitoring of bit errors has the added advantage of providing valuable diagnostics of system problems.

The new chip supports different types of FEC algorithms. The standard (255,239) Reed-Solomon is supported. A priority higher gain FEC algorithm is also support. This proprietary algorithm is highly configurable. These configuration parameters are determined automatically based on the link error diagnostics. The adjusted FEC has improved coding gain and error correction for the specified link. In this manner, the chip will select the type of FEC algorithm that is most optimal for the type of noise on the specific optical link. The error characteristics also depend on the modulation technique employed on the optical link. To provide a further comprehensive technique, the adaptive FEC can be optimized to the modulation schemes (such as NRZ or RZ) employed on the link.

As shown in FIG. 8, the adaptive algorithm optimizes both the transmitter FEC encoder and the receiver FEC decoder to the same algorithm. Upon link initialization of lambda1, both the FEC encoder in the transmitter in node 1 and the FEC decoder of the receiver on node 2 start with the predefined default algorithm a0. During normal operation, the decoder at the receiver end in node 1 gathers error statistics of this optical link on lamba1. The system determines the optimum algorithm a1 for this link based on the error statistics, and sends a code number a1 indicating the chosen optimum algorithm to node 1. Upon receiving the algorithm code, the transmitter in node 1 sends a preamble signal indicating a switch to a1, then starts sending data encoded per the a1 algorithm. The receiver in node 2 continues using the a0 algorithm till it receives the preamble signal. Once received, the receiver in node 1 starts decoding the received bit stream using the new algorithm a1. This optimization happens periodically in a dynamic fashion ensuring that the algorithm can adapt to a channel with changing error characteristics.

The new chip can accept multiple asynchronous inputs. Furthermore, some of those inputs may arrive at non-standard rates. In order to multiplex all these signals together, the different signals need to be frequency-justified in order to equalize their bit rates.

While standard signals (such as Sonet and ATM) are adjusted using the standard OTN frequency justification mechanism, other non-standard bitstreams are frequency-justified using the new design's own mechanism. Such a mechanism must support a wide range of input frequencies. The rate adjustment may be achieved by inserting idles insertion.

At the egress of an OTN cloud, the new chip will regenerate the original client signals. In the case where these signal are asynchronous, the egress new chip has to be able to recover the original clock for each signal.

Figure 9A:
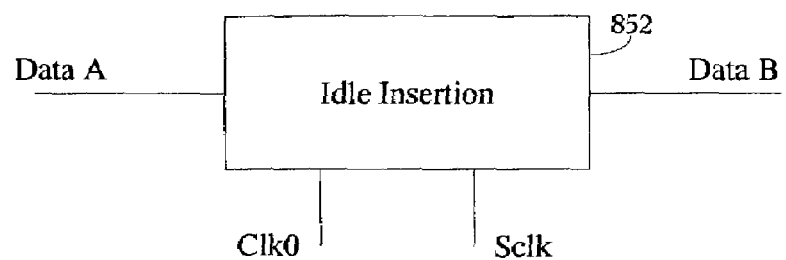
FIGS. 9A–B illustrate an exemplary operation an original clock rate clk0 is recovered from the data according to an embodiment of the invention.
Figure 9B:
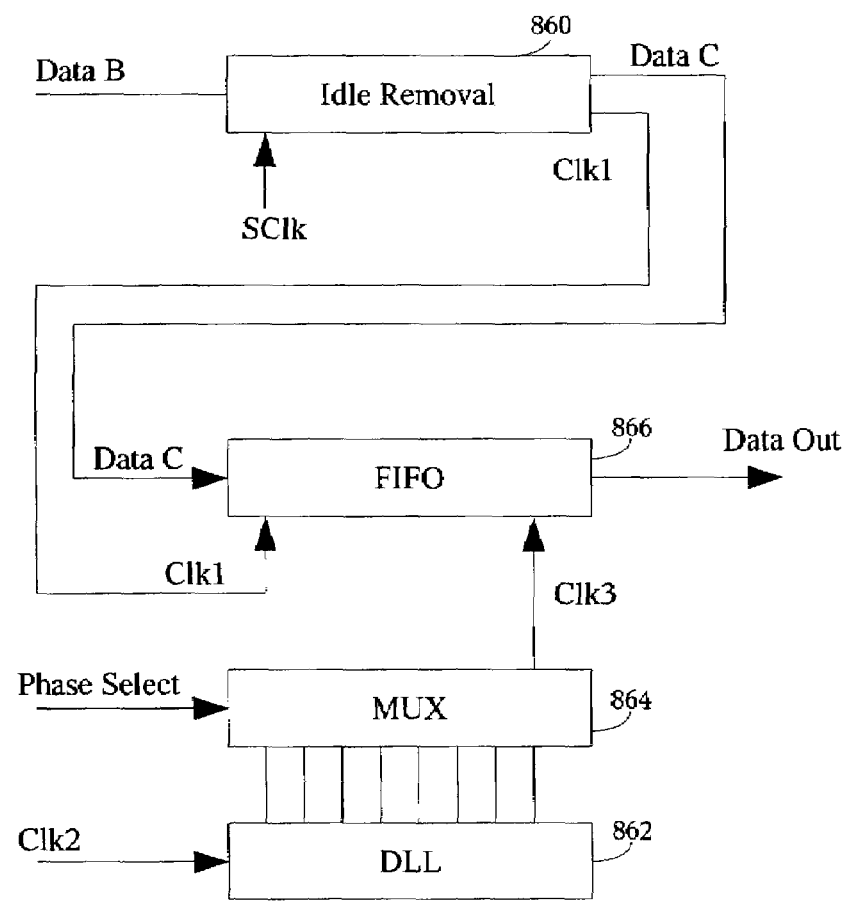

FIGS. 9A–B show how the original clock rate Clk0 may be recovered from the data. On the egress side (FIG. 9A), the data is carried at the system clock rate SClk, and idles are inserted by an idle insertion structure 852 to bring up the rate to the system clock. On the ingress side (FIG. 9B), idles are removed by structure 860, and a gapped clock is produced where idles were previously inserted. The gapped clock has its edges aligned to the system clock, but has the same number of transitions as the original clock Clk0. Clk2 is a local clock, which is plesiochronous to Clk0, and is used in a DLL 862 to produce multiple phases. A multiplexor (mux) 864 selects the proper phase for reading the data from the FIFO (first in first out) 866 memory. The output of the mux clock Clk3 has the same frequency as Clk0, and can be designed to have an acceptable amount of jitter. Consequently, the new chip overcomes a common difficulty that normally exists with the use of non-standard FEC rates. An novel FEC algorithm produces a proprietary clock rate, which employs custom clocking parts such as specific rate SAW (surface acoustic waveform) oscillators. The chip uses common data rates such as 5/4 sonet rate and 17/16 sonet rate. The internal chip algorithm produces non-common rates, but the external chip data transfer rate is adjusted to fit the existing common rates of 5/4 and 17/16. This is achieved by stuffing bytes to bring up the internal proprietary rate to 5/4 or 17/16.

The new chip uses programmable cores to perform most framing functionality. The programmability allows the framers to perform very complex functions that would normally be very hard to implement in hardware. The programmability makes the chip extremely flexible, since accepting new protocols or introducing new framing standards simply requires modifying the software and reprogramming the cores (no hardware modification is necessary). Another use of this feature is the ability to sell different versions of the chip to different markets by simply modifying the software, and without having to change the hardware.

The new chip has a Generalized Framing Procedure (GFP) engine that can encapsulate different types of packet inputs (e.g., Ethernet, ATM, PPP, Fibre Channel) as defined by the GFP standard. Since the new chip has a raw packet input interface (SPI-4/5), it can also accept raw IP packets. This would be the case if the new chip is used in a router line card. Because of the raw IP application, the new GFP engine has been extended so that it can encapsulate IP packets directly into GFP without having to use an intermediate protocol such as PPP or HDLC.

3. Advanced System Functions and Integration

Figure 10A:
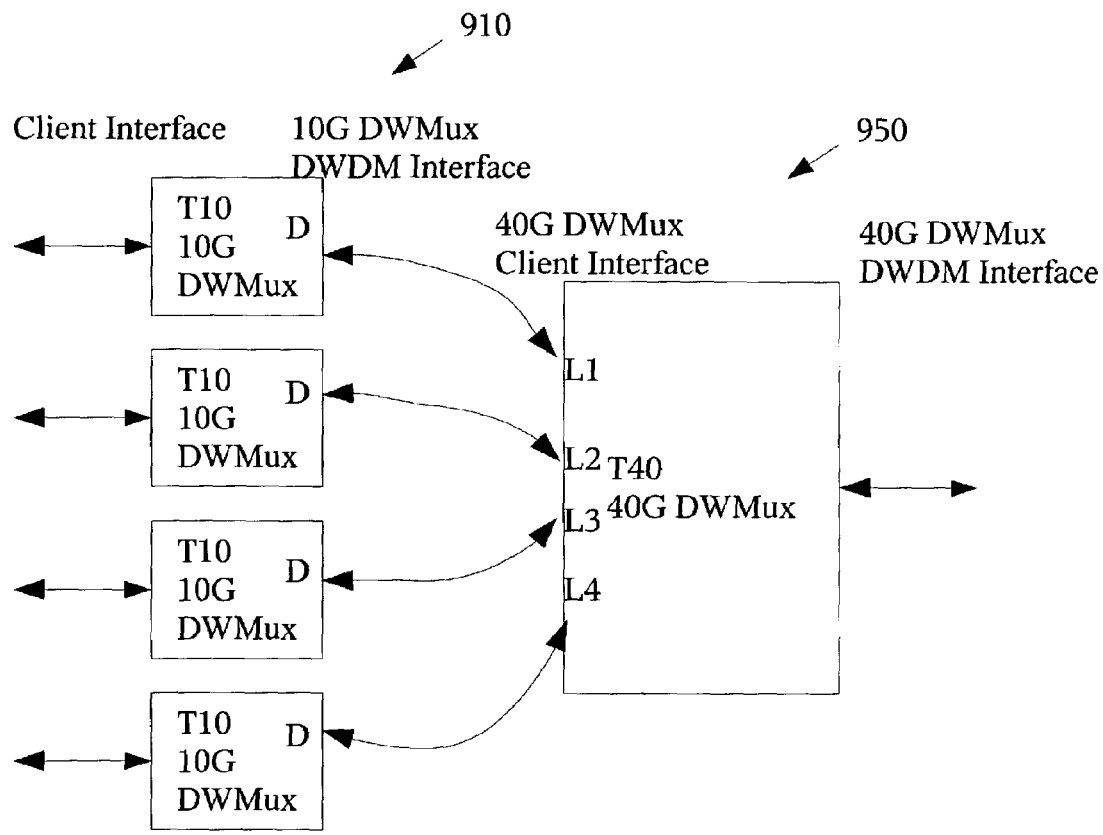
FIG. 10A depicts a circuit for multiplexing 10 G signals into a 40 G signal according to an embodiment of the invention.

FIG. 10A depicts a circuit for multiplexing 10 G signals into a 40 G signal according to an embodiment of the invention. The circuit configuration shows an exemplary combination of 10 G streams into a 40 G stream. Note that the aggregation of data from the T10 chips 910, 920, 930, 940 to the T40 chip 950 is in some ways similar to that between the interfaces shown in the FIGS. 6A–C line cards and their corresponding physical network connections. In this case, the line cards are supported by a chassis and communicate with one another over a backplane.

Figure 10B:
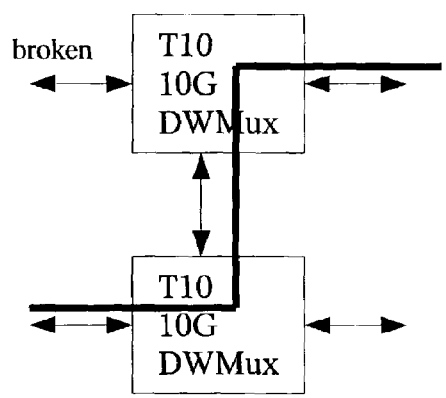
FIGS. 10B–E depict techniques for using protection ports for fault tolerant operation according to an embodiment of the invention.
Figure 10C:
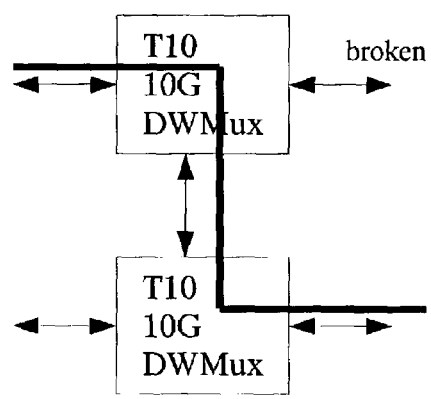
Figure 10D:
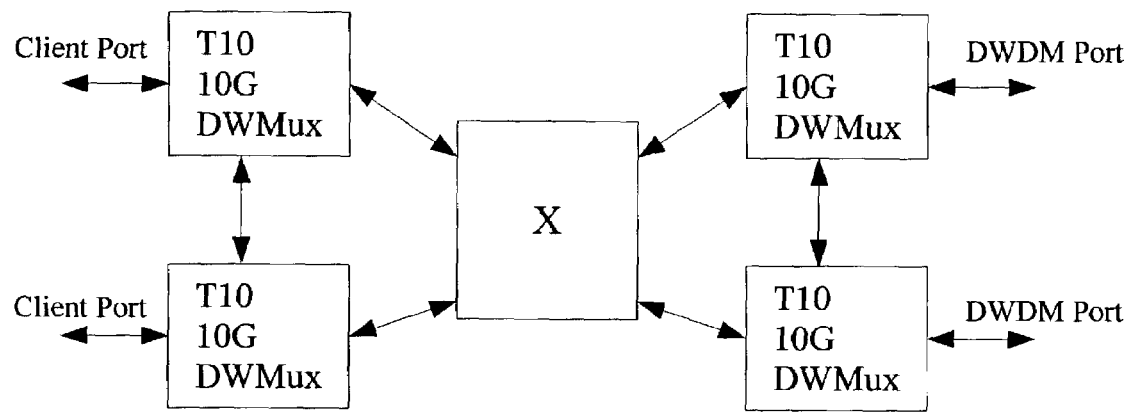
Figure 10E:
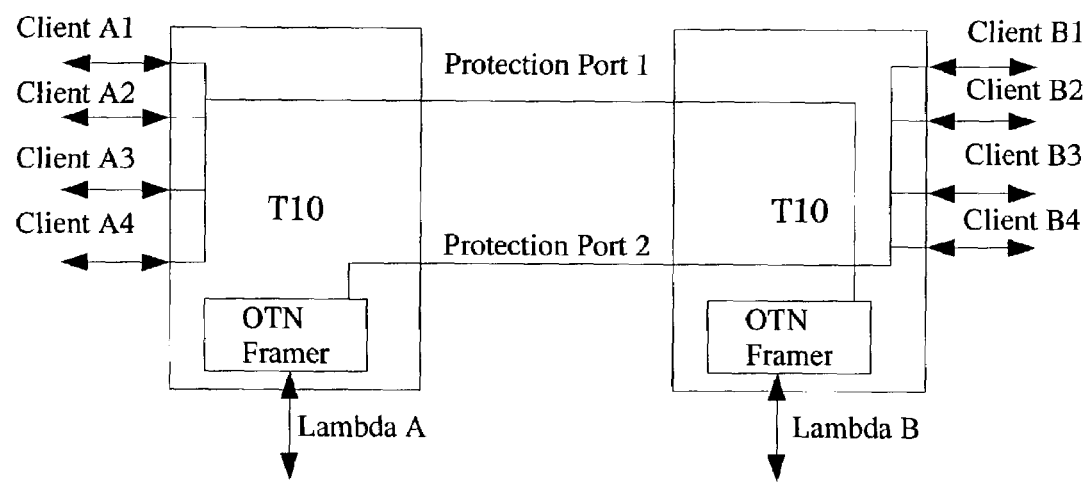

FIGS. 10B–E depict techniques for using protection ports for fault tolerant operation according to an embodiment of the invention. FIGS. 10B–C show how the architecture of FIG. 10A can be employed to support a fault in either the client side or the DWDM side. In either case, the signals are redirected through the protection port to a neighbor circuit that completes the functions. FIGS. 110D–E show a configuration of multiple circuits that are cross-connected with one another to provide fault tolerant support.

Figure 11:
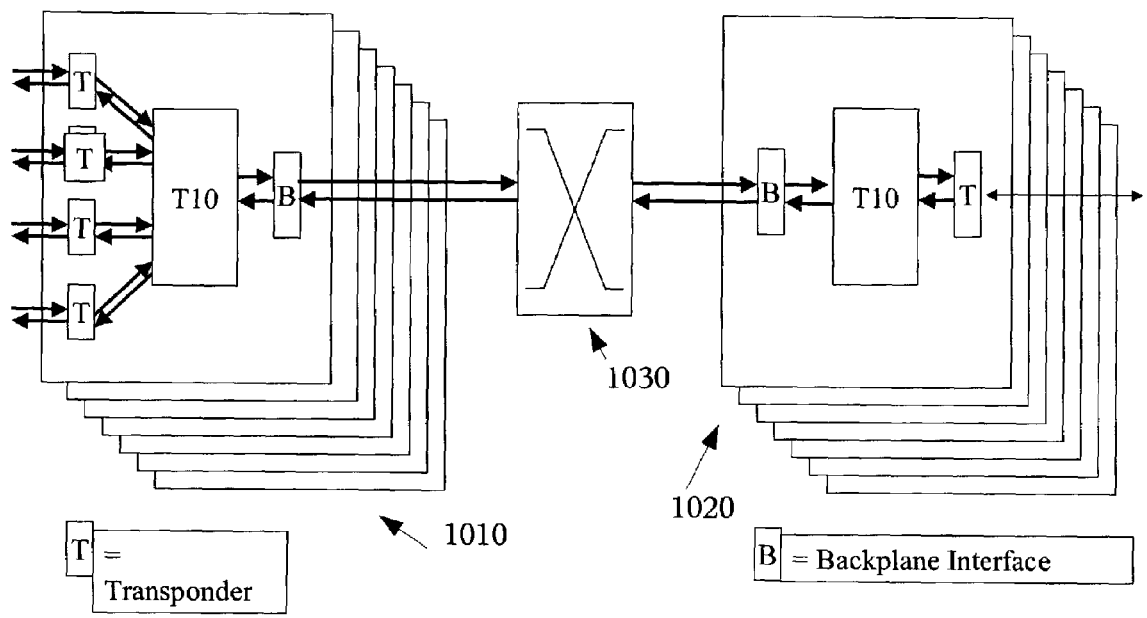
FIG. 11 depicts a circuit for performing a switching function according to an embodiment of the invention.

FIG. 11 depicts a circuit for performing a switching function according to an embodiment of the invention. The line cards 1010, 1020 are supported in a chassis and then interconnected to the switch fabric 1030. The switch 1030 is capable of routing information from a first line card to another line card. This function can be achieved using a conventional crossbar switch or other switch fabric.

Figure 12:
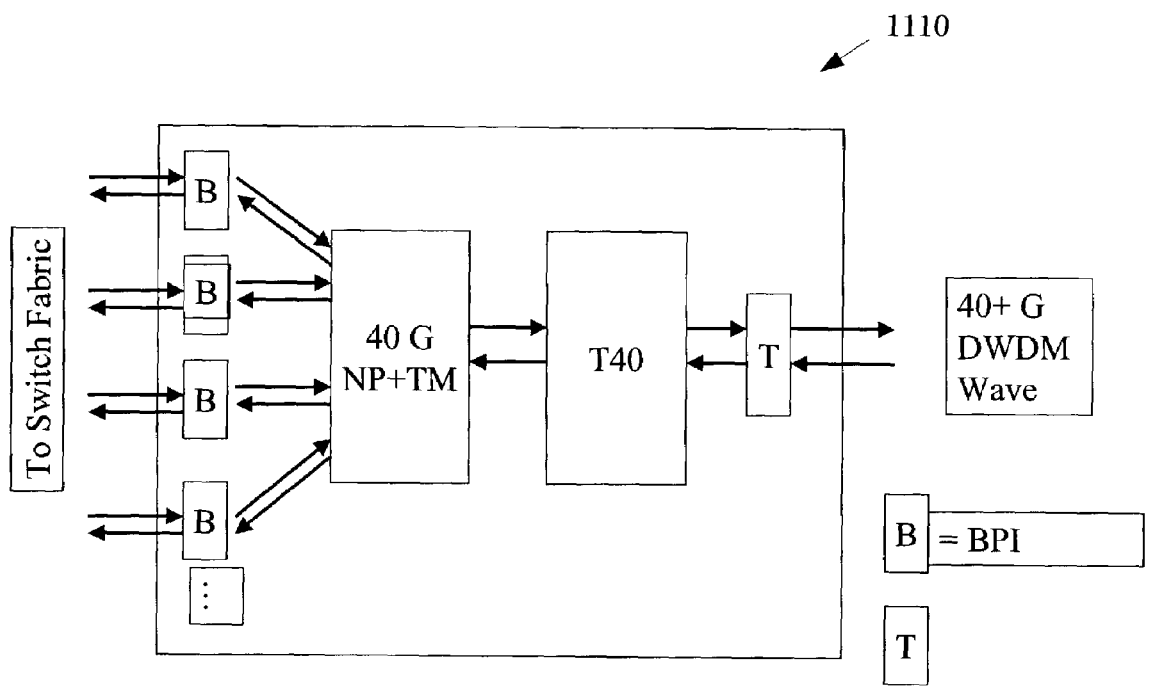
FIG. 12 depicts a line card according to an embodiment of the invention.

FIG. 12 depicts an advanced system line card according to an embodiment of the invention. The line card 1110 is used to connect the output of a router or packet switch to a DWDM network. The T40 chip will take raw packets from the network processor (NP), frame them with OTN, and send them out on the DWDM interface.

C. Conclusion

Advantages of the invention include a high-speed network and network components that are capable of performing at a level consistent with optical network systems and which efficiently supports DWDM in a space-effective and cost-effective manner.

Having disclosed exemplary embodiments and the best mode, modifications and variations may be made to the disclosed embodiments while remaining within the subject and spirit of the invention as defined by the following claims.

The invention claimed is:

1. A high-speed optical data transport network for communicating over a DWDM segment, comprising:

a first transceiver coupled to the DWDM segment for communicating information over the DWDM segment, and a second transceiver coupled to the DWDM segment for communicating information over the DWDM segment with the first transceiver;

wherein the first transceiver and second transceiver each include:

(a) a plurality of line circuits each including an external communication interface for communicating with external systems using protocols having overhead and a DWDM communication interface using a optical transport network (OTN) protocol having optical transport network overhead;

(b) a communication structure for enabling communication between the plurality of line circuits;

(c) wherein each of the plurality of line circuits includes a line decoder to decode inbound information from the external communication interface including the overhead and a line encoder configured to encode outbound information to the external communication interface; and (d) wherein each of the plurality of line circuits includes an OTN decoder to decode inbound information from the DWDM interface including at least a portion of the overhead and an OTN encoder configured to encode outbound information to the DWDM interface while preserving at least a portion of the overhead; and (e) an adaptive forward error correction (FEC) circuit configured to characterize an error pattern received by the transceiver, wherein the FEC circuit determines a selected algorithm from a group of possible algorithms based on at least one error statistic.

2. The network of claim 1, wherein:

each transceiver is configured to transmit a preamble containing the selected algorithm and is configured to receive a preamble identifying the selected algorithm and to begin using the algorithm once received.

3. The network of claim 2, wherein:

the FEC circuit is configured to determine a selected algorithm for each communication path.

4. The network of claim 1, wherein:

the FEC circuit is configured to determine a selected algorithm for each communication path.

5. A transceiver for communicating over a DWDM segment, comprising:

(a) a plurality of line circuits each including an external communication interface for communicating with external systems using protocols having overhead and a DWDM communication interface using a optical transport network protocol having optical transport network overhead;

(b) a communication structure for enabling communication between the line cards;

(c) wherein each of the line cards includes a line decoder to decode inbound information from the external communication interface including the overhead and a line encoder configured to encode outbound information to the external communication interface;

(d) wherein each of the line cards includes a OTN decoder to decode inbound information from the DWDM interface including at least a portion of the overhead and an OTN encoder configured to encode outbound information to the DWDM interface while preserving at least a portion of the overhead;

(e) an adaptive forward error correction (FEC) circuit configured to characterize an error pattern received by the transceiver, the FEC circuit determines a selected algorithm from a group of possible algorithms based on at least one error statistic.

6. The transceiver of claim 5, wherein:

each transceiver is configured to transmit a preamble containing the selected algorithm and is configured to receive a preamble identifying the selected algorithm and to begin using the algorithm once received.

7. The transceiver of claim 6, wherein:

the FEC circuit is configured to determine a selected algorithm for each communication path.

8. The transceiver of claim 5, wherein:

the FEC circuit is configured to determine a selected algorithm for each communication path.

9. A method of transporting information over a high-speed optical data transport network including a DWDM segment, comprising the steps of:

receiving original information in a first transceiver from external systems using protocols having conventional overhead;

decoding the original information and then encoding the information to create an Optical Transport Network (OTN) information structure that preserves at least a portion of the overhead:

sending the OTN information from the first transceiver over the DWDM segment to a second transceiver;

receiving the OTN information in a second transceiver;

decoding the OTN information in a second transceiver to recover the original information, including at least a portion of the overhead;

sending the original information from the second transceiver to external systems using conventional protocols having overhead;

characterizing an error patter received by the transceiver using a forward error correction (FEC) circuit; and determining a selected algorithm from a group of possible algorithms based on at least one error statistic.

10. The method of claim 9, further comprising the step of:

the first transceiver transmitting a preamble containing the selected algorithm; and the second transceiver receiving the preamble identifying the selected algorithm and using the algorithm once received.

11. The network of claim 10, wherein:

the determining step is performed for each communication path.

12. The method of claim 9, wherein:

the determining step is performed for each communication path.

* * * * *